Nov. 23, 1948.  L. ADLER ET AL  2,454,420
OLEOMARGARINE COLORING UNIT
Filed May 17, 1946

INVENTORS
LEON ADLER, HAROLD G. JOHNSON &
BEEASON J. SCHNEIDER
BY: *Ben V. Zillman*
ATTORNEY Patented Nov. 23, 1948

2,454,420

UNITED STATES PATENT OFFICE 2,454,420

OLEOMARGARINE COLORING UNIT

Leon Adler, Harold G. Johnson, and Beeason J. Schneider, St. Louis, Mo., assignors to Dyestuffs & Chemicals, Inc., St. Louis, Mo., a corporation of Missouri Application May 17, 1946, Serial No. 670,379

3 Claims. (Cl. 99—148)

This invention relates to improvements in a coloring unit for oleomargarine and other oleaginous plastics generally prepared for sale in uncolored state, so that purchasers of the same may color the same afterwards.

One of the principal objects of this invention is to so construct a coloring unit of the kind described, that it shall include a non-flowing, oil-soluble coloring mass encased in an oil-insoluble coating having the characteristic of being friable, or of being dispersible in the oleomargarine.

Another of the important objects of the invention is to so construct such a coloring unit that its coating will be edible in itself and therefore be unobjectionable when consumed as a part of the product colored by the same.

An added object of our invention is to constructing such a coloring unit, so that its coating will be softened or more or less absorbed or dissolved by the water content of the oleomargarine, with the result that the texture and smoothness of said resultant product will be unimpaired to any noticeable degree, or this coating may be broken up into such very small particles by the usual kneading or working of the coloring unit thereinto that it will not be particularly noticeable or distasteful to a person eating the resultant colored product.

A further object of our invention is to provide a mass of coloring material with a preferably uncolored sheath of a friable or of a readily dispersible plastic nature, so that such units may be stored or otherwise handled in their usual course of trade practices without danger of accidentally breaking them, and insuring that they will retain their coloring material fresh and strong after storage through usual room temperatures and under average weather conditions.

A still further object of this invention is to so prepare a coloring unit for intimate packaging with a block of oleomargarine that the two may be thereafter distributed as a sales unit or assembly, and wherein the coloring unit is composed of a mass of coloring material sealed with a casing or coating that is substantially water-absorbent but oil-resistant, and said coating having as it prime requisite the characteristic of normally preventing transference of color from said unit to the mass of oleomargarine in direct contact therewith.

Still another object of this invention is to so construct a coloring unit having the aforesaid characteristics, and which may be ruptured simply by working said unit and oleomargarine together as a unit, and whereupon color transference between said coloring unit and oleomargarine is started and may be continued until the latter has been colored homogeneously throughout.

Yet another object of our invention is to so pack said oleomargarine block that the coloring unit will be assembled together with and in direct contact with said block and even embedded therein, and be of such characteristics that the coloring of said oleomargarine may be done without directly touching the latter by the usual kneading, but by transferring the block and unit to a mixing bowl and thereafter mixing with a fork, spoon or other handy implement or tool, or in those cases wherein there is a tough flexible wrapper about the block and the coloring unit, such transference of color may be done without breaking said assembly, simply through working or kneading of said assembled block and coloring unit together.

Some other objects of our invention include the production of a sales package containing a block of oleomargarine with a coloring unit therefor, all wrapped into a sufficiently large flexible wrapper strong enough to withstand kneading of such contents without tearing or breaking, making such a sales package neat, attractive and convenient to use, or by wrapping within a wrapper that is sealed and being flexible and strong enough to withstand such kneading of its contents without becoming torn or breaking through either the wrapper or its seal, it being understood that many kinds and forms of oleoaginous commodities other than oleomargarine may be thus packaged as an assembled sales unit, as desired.

Other objects and advantages of the invention herein shown and described will be obvious to those skilled in the art to which the invention appertains, as will be seen from the disclosures herein given.

To this end, our invention consists in the novel construction, arrangment, arrangement and combnation of parts, and the method of obtaining the same, as herein shown and described, and as will be more particularly pointed out in the claims hereunto appended.

In the drawings, wherein like reference characters indicate like or corresponding parts throughout the views, Figure 1 is a top plan view of one of our coloring units;

Figure 1:
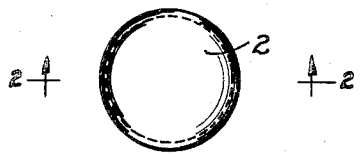
Figure 2:
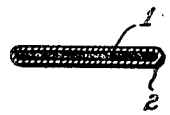
Figure 2 is a cross-sectional view through the same, taken substantially along the line 2—2 of Fig. 1.
Figure 3:
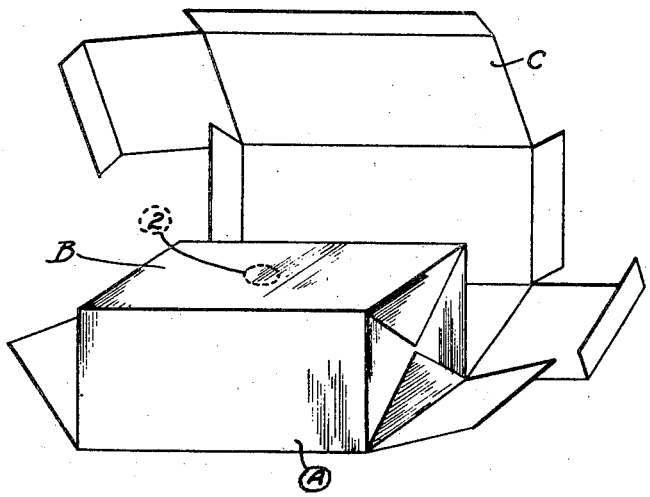
Figure 3 is a perspective view of a sales package wherein our invention is employed, said package being partly opened.
Figure 4:
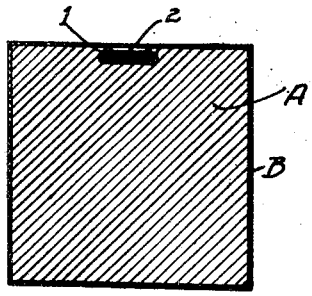
Figure 4 is a transverse cross-sectional view through the latter, with the outer carton removed.

In the usual practice of marketing oleomargarine for the retail trade, the same is packed in one-pound cartons, and when the sale is made, the purchaser is given a coloring unit sufficient for coloring such uncolored block of oleomargarine. This coloring unit may be in the form of a powder, paste or liquid, of an amount or dosage sufficient to color said unit amount of oleomargarine to the desired tint or shade, now always yellow. The ultimate consumer must then initially open this coloring unit so that its contents may be exposed and then empty the latter onto the oleomargarine or into the same receptacle to receive the oleomargarine, for subsequent intermixing.

Such a handling of the coloring is messy, to say the least, and leaves the hands stained, inasmuch as said coloring is relatively intense, and the principal object of our invention is to so construct the coloring unit that it will not transfer its color until kneading or mixing of the oleomargarine and coloring unit together is commenced, the transference then continuing until all of the color has been dispersed homogeneously through the block or mass of oleomargarine.

Even though such a coloring unti can be handled without discoloring the hands, on account of providing it with a protective coating, we prefer to incorporate such a coloring unit as an integral unit with said block, and wherein the coloring unit will not normally transfer any of its coloration to the oleomargarine until the mixing or kneading is done at home.

Referring more particularly to the drawings, wherein one embodiment of our invention is disclosed, A indicates a block of oleomargarine or the like, generally of one pound weight for home use and of the usual prismatic shape common to the trade. For reasons needless to enter into herein, this commodity is nearly always sold uncolored, and the purchasers can color the same before serving.

In our invention, the coloring unit may be packed as a vital or integral part of the sales unit, and may be either placed directly on the oleomargarine or embedded in the latter. It is necessary, however, that there be no transference of coloration from said coloring unit to the oleomargarine during normal handling of the package, but only through intentional manipulation to that end.

A very small amount of an oil-soluble or dispersible coloring mass or dye is made up into a non-flowing composition, such as a paste or a powder, preferably selecting a food coloring considered permissible for this use by the agencies dealing with the enforcement of the various laws dealing with the manufacture and sale of oleomargarine, and it is herein suggested that F. D. & C. yellow No. 3 and F. D. & C. yellow No. 4 be used as colorings for this purpose. Carriers or diluents found acceptable for these dyes are starch, flour, sodium bicarbonate, salt, oil, a polyhydroxy alcohol such as glycol, glycerine or glyceryl monostearates, and hydrogenated oil or fat, singly or in mixtures. In addition, a small amount of a binder such as gum acacia or arabic, guaiac, mastic, myrrh, senegal, tragacanth, etc., may be used to give the desired plastic quality to the color mass.

At this point it might be noted that although it might be expected that the use of a hydrogenated fat or oil would provide the best material for blending the color into the mass of oleomargarine, it has been found unexpectedly that it was much better and easier to perform such blending when using glycerine or another polyhydroxy alcohol as an ingredient of the color mass. Furthermore, the use of such glycerine required less color, but gave an added color value or color intensity to the same relative dye concentration and made the resultant finished kneaded oleomargarine more pleasing to the eye.

One suggested formula for such a coloring composition which we have found satisfactory for the purpose is 100 pounds of sodium chloride triturated with 9 pounds of F. D. & C. yellow No. 3 and 9 pounds of F. D. & C. No. 4 and then mixed with 29 pounds of glycerine. This compound is made into an intimate mixture, and for each unit or dose about 123 milligrams of the same is shaped up into a pellet 1, this amount being sufficient to color a one-pound block of oleomargarine in a pellet machine or some other suitable molding apparatus. The particular process of making such pellets, tablets, lozenges, etc., acceptable for their intended use is not in itself a part of this invention, and is well known in the trade of tablet making. Further, it is obvious that the exact shape of such tablet or pellet is not of importance, and that the one shown herein is merely illustrative of one of the many shapes possible.

Another formula for the coloring composition for making the pellets 1, and which has been tested and found suitable is 100 pounds of sodium bicarbonate triturated with 9 pounds of F. D. & C. yellow No. 3 and 9 pounds of F. D. & C. yellow No. 4, and then mixed with 40 pounds of glycerine. Approximately 131 milligrams of such intimate mixture is shaped up or molded for each pellet or dose in this instance.

Obviously, a tablet or pellet of the nature and composition just described would begin to transfer its coloration to the oleomargarine or other oleoaginous mass immediately upon any contact therewith, and in order to render such action normally impossible we have developed a preferably friable or a dispersible plastic sheath 2 about said coloring mass, and having such characteristics that it can be placed in direct contact with or even embedded in the block of oleomargarine without color transference under normal handling. However, when the buyer actually desires the color transference to start, he can place the block of oleomargarine with said coloring unit thereon or therein, into a mixing bowl or the like after having removed the flexible wrapper therefrom, and thence manipulate the said block and coloring unit together. Or he can commence said kneading and working without unwrapping the block, or touching the coloring unit. In either method, the kneading and working of the block and coloring unit will rupture the latter and commence the transference of color to the oleomargarine, the kneading being continued of course, until the color has become intimately associated with the oleomargarine mass.

To secure this characteristic of normally preventing color transfer until kneading and working is commenced, we make this sheath 2 as a coating to seal the color mass 1 within the same, said coating being preferably oil-resistant or oil-insoluble, although it may be water-absorbent or water-dispersible. This coating 2, preferably colorless or white, will therefore remain intact and keep its protective jacket about the color mass throughout normal handling.

The coating may be applied by any of the well-known means and one coating which we have found suitable for the purpose is made of sugar dissolved in water so as to give a concentrated solution approximating a specific gravity of 1.3. This dries out to form a firm coating, which may be improved by proper use of glycerine, gum tragacanth, powdered sugar, powdered gelatin, powdered starch, etc. It is to be understood that variations in the nature of the color mass, either in the carrier or diluent, or in the aids for a more rapid disintegration or a dispersibility of the coloring in the mixing into the oleomargarine, or in the plasticity of firmness of the pellet are at the choice of the manufacturer of the same. The only basic requirements are that the color mass shall be uniformly dispersible or soluble in the oleomargarine, and that the coating shall be friable or dispersible, and be oil-resistant or insoluble, but may be water-absorbent.

Thus, such a coated pellet may even be embedded in the block of oleomargarine and remain inactive there without any color transference, although the coating may swell or otherwise absorb some of the small amount of water from the composition of the oleomargarine, the percentage of water in the oleomargarine mixture being presently limited by law to not more than twenty percent. This hygroscopic action or characteristic of the coating permits the latter to be in effect, dispersed through the mass of the block by thorough manipulation and kneading, and will not be objectionable to sight or taste thereafter.

The block of oleomargarine, with the coloring unit directly superimposed thereon or sometimes embedded therein, are wrapped within a preferably translucent parchment type of paper B, sufficiently strong to withstand kneading, pressing and pounding without rupture, tear or breakage, and may be sealed or not, depending upon the nature of the wrapper and the suggested method of working to be used.

A box or carton C made of a sheet of waxed paperboard or the like, properly creased and scored so as to permit being folded to the prism formation indicated, may be used as an outermost wrap for the sales package.

When it is desired to color the oleomargarine so as to make it more pleasing for table use, the block is removed from the refrigerator and left to warm to room temperature. Thereupon, and with the outer carton removed, the remainder may be transferred to a mixing bowl or the like, with or without the flexible wrapper in place.

In either case of manipulation the operator need not handle the coloring unit by itself. In one case, he may remove said flexible wrapper and then mix its contents with a fork, spoon or other suitable tool or implement, in the bowl until coloration is homogeneous throughout the resultant mass. This action first ruptures the coating so as to permit color transference to start, and the continued working disperses the rest of the color to the oleomargarine mass.

In the second method the operator need not remove the flexible wrapper, but may transfer the same with its contents to the mixing bowl, wherein the same may be pounded, knocked, kneaded and otherwise worked, such action initially breaking the pellet to cause color transference, and wherein continued working will carry coloration throughout the mass, all without leaking through the wrapper, or breaking or tearing the same.

In either case, it breaks up said pellet so that its coating is in minute particles dispersed throughout the oleomargarine, and without lumps, or said particles are so softened to blend perfectly with the edible mass; such coating being edible and not readily noticeable or objectionable.

When through kneading, the resultant colored mass may be reshaped to approximately its original shape and again chilled or hardened for subsequent use.

Having thus described our invention, it is obvious that various immaterial changes may be made in the same without departing from the spirit of our invention; hence we do not wish to be understood as limiting ourselves to the exact arrangement, form, construction and combination herein shown and described, except as limited by the state of the art to which this invention appertains, and the claims hereunto appended.

What we claim as new and desire to secure by Letters Patent is:

1. An oleomargarine coloring unit adapted to be worked as a whole into the oleomargarine and consisting of an aggregate mass containing coloring material that is substantially soluble in the oleomargarine, and an oil-insoluble unitary coating enclosing said aggregate mass as a unit and all being dispersible in said oleomargarine.

2. An oleomargarine coloring unit adapted to be worked as a whole into a block of oleomargarine to color the latter, and consisting of an aggregate mass containing oil-soluble coloring material for coloring said oleomargarine and a saccharide coating sealing the entire mass of coloring material as a unit, the entire unit being dispersible in said oleomargarine.

3. In an oleomargarine sales package including a body of oleomargarine, a coloring unit normally directly contacting said oleomargarine without transferring color thereto and consisting of an aggregate mass containing oil-soluble coloring material dispersible within said oleomargarine, and a unitary oil-resistant edible coating enveloping said coloring mass to form said unit and which is dispersible in said oleomargarine, whereby said coating may be broken into minute particles by the kneading of the contents of the package to transfer the color to the said oleomargarine.

LEON ADLER.
HAROLD G. JOHNSON.
BEEASON J. SCHNEIDER.

REFERENCES CITED

The following references are of record in the file of this patent:

UNITED STATES PATENTS

| Number | Name | Date |
|---|---|---|
| 1,388,174 | Denny | Aug. 23, 1921 |
| 1,829,947 | Schneller | Nov. 3, 1931 |
| 1,921,738 | Files | Aug. 8, 1933 |
| 1,986,783 | Adler | Jan. 8, 1935 |
| 2,042,173 | Files | May 26, 1936 |
| 2,052,175 | Haurand | Aug. 25, 1936 |
| 2,107,851 | Boehm | Feb. 8, 1938 |
| 2,347,640 | Peters | May 2, 1944 |